(12) United States Patent
Mendoza (10) Patent No.: US 10,193,993 B2
(45) Date of Patent: Jan. 29, 2019

(54) SYSTEMS AND METHODS OF TOKEN PIGGYBACKING

(71) Applicant: eBay Inc., San Jose, CA (US)

(72) Inventor: Victor Mendoza, Revere, MA (US)

(73) Assignee: eBay Inc., San Jose, CA (US)

( * ) Notice: Subject to any disclaimer, the term of this patent is extended or adjusted under 35 U.S.C. 154(b) by 557 days.

(21) Appl. No.: 13/905,503

(22) Filed: May 30, 2013

(65) Prior Publication Data

US 2014/0359073 A1  Dec. 4, 2014

(51) Int. Cl.
*H04L 29/08*  (2006.01)
(52) U.S. Cl.
CPC ........ *H04L 67/2814* (2013.01); *H04L 67/146* (2013.01); *H04L 67/02* (2013.01); *H04L 67/22* (2013.01)
(58) Field of Classification Search
CPC ............. H04L 67/142; H04L 29/08621; H04L 67/146; H04L 29/08738; H04L 67/02; H04L 67/22; H04L 67/2814
USPC ......................................................... 709/219
See application file for complete search history.

(56) References Cited

U.S. PATENT DOCUMENTS

| | | | | |
|---|---|---|---|---|
| 6,985,953 | B1 * | 1/2006 | Sandhu | G06F 17/3089 709/225 |
| 8,874,695 | B2 * | 10/2014 | Zhang | G06F 17/30899 709/203 |
| 8,898,302 | B2 * | 11/2014 | Deu-Ngoc | H04W 76/027 709/223 |
| 2002/0099936 | A1 * | 7/2002 | Kou | H04L 63/0442 713/151 |

(Continued)

FOREIGN PATENT DOCUMENTS

| | | |
|---|---|---|
| CN | 1478348 A | 2/2004 |
| CN | 101540734 A | 9/2009 |

(Continued)

OTHER PUBLICATIONS https://www.youtube.com/watch?v=yXmNmckX4sl Gideon Samid Nov 23. 2013.*

(Continued)

*Primary Examiner* — John M Macilwinen
(74) *Attorney, Agent, or Firm* — Schwegman Lundberg & Woessner, P.A.

(57) ABSTRACT

A method, system, and computer-readable medium are disclosed for generating a unified user profile. For example, a system may store, on a client device, a token under a first domain name. The token may specify state data for a communication session between the client device and a first content publisher addressed by the first domain name. The communication session utilizes a stateless communication protocol. The system may then generate a redirection resource locator. The redirection resource locator may include an identifier for a web object belonging to a second content publisher addressed by a second domain name and the token. The system then stores, on the client device, the token under the second domain name by directing the client device to send a web object request generated based at least in part on the redirection resource locator to the second content publisher. The web object request may request the web object from the second content publisher and including the token.

18 Claims, 9 Drawing Sheets

(56) References Cited

U.S. PATENT DOCUMENTS

| | | | | |
|---|---|---|---|---|
| 2003/0018752 | A1* | 1/2003 | Lowy | G06Q 30/02 |
| | | | | 709/219 |
| 2003/0074580 | A1* | 4/2003 | Knouse | H04L 63/0815 |
| | | | | 726/4 |
| 2005/0044224 | A1 | 2/2005 | Jun et al. | |
| 2005/0086344 | A1* | 4/2005 | Suesserman | H04L 67/02 |
| | | | | 709/227 |
| 2005/0204148 | A1* | 9/2005 | Mayo | H04L 63/0815 |
| | | | | 713/185 |
| 2006/0112411 | A1 | 5/2006 | Takai et al. | |
| 2006/0112422 | A1 | 5/2006 | Tevosyan et al. | |
| 2008/0313010 | A1 | 12/2008 | Jepson et al. | |
| 2009/0024737 | A1* | 1/2009 | Goldspink | G06F 11/3495 |
| | | | | 709/224 |
| 2013/0013777 | A1 | 1/2013 | Krywaniuk | |
| 2013/0073609 | A1* | 3/2013 | Connolly | G06F 15/16 |
| | | | | 709/203 |
| 2013/0124309 | A1 | 5/2013 | Traasdahl et al. | |
| 2013/0132596 | A1* | 5/2013 | Metzger | H04L 63/123 |
| | | | | 709/228 |
| 2014/0164447 | A1* | 6/2014 | Tarafdar | G06F 17/30194 |
| | | | | 707/827 |

FOREIGN PATENT DOCUMENTS

| | | | |
|---|---|---|---|
| CN | 105556501 A | 5/2016 | |
| EP | 1 346 548 B1 * | 9/2001 | H04L 29/06 |
| EP | 3005134 B1 | 10/2018 | |
| KR | 101768793 B1 | 8/2017 | |
| WO | WO-2013030107 A1 | 3/2013 | |
| WO | WO-2014193532 A1 | 12/2014 | |

OTHER PUBLICATIONS

Vogt et al. Cross-site scripting prevention with dynamic data tainting and static analysis. In Proceedings of the 14th Network and Distributed System Security Symposium. 2007. pp. 1-12.*

Google Answers. "Storing and retrieving non 3rd party cookies across multiple domains". Jun. 30, 2006. pp. 1-4.*

"International Application Serial No. PCT/US2014/032269, International Search Report dated Aug. 28, 2014", 2 pgs.

"International Application Serial No. PCT/US2014/032269, Written Opinion dated Aug. 28, 2014", 4 pgs.

"European Application Serial No. 14804435.7, Response filed Jun. 24, 2016 to Communication pursuant to Rules 161(1) and 162 EPC dated Jan. 22, 2016", 9 pgs.

"Australian Application Serial No. 2014272150, First Examiner Report dated Aug. 15, 2016", 3 pgs.

"Australian Application Serial No. 2014272150, Response filed Jan. 13, 2017 to First Examiner Report dated Aug. 15, 2016", 17 pgs.

"Australian Application Serial No. 2014272150, Subsequent Examiners Report dated Jan. 31, 2017", 12 pgs.

"Canadian Application Serial No. 2,913,880, Office Action dated Nov. 16, 2016", 3 pgs.

"European Application Serial No. 14804435.7, Extended European Search Report dated Jan. 13, 2017", 12 pgs.

"Google Answers: Storing and retrieving non 3rd party cookies across mutiple domains", Retrieved from the Internet<URL:http://answers.google.com/answers/threadview/id/742376.html>, (Jun. 30, 2006).

"How to set a cookie for another domain", Retrieved from the Internet: <URL:http:/lstackoverflow.com/questions/6761415/how-to-set-a-cookie-for-another-domain>, (Jul. 20, 2011).

"Korean Application Serial No. 2015-7036895, Office Action dated Feb. 17, 2017", (With English Translation), 8 pgs.

Office Action received for Chinese Patent Application No. 201480043032.8, dated Jan. 9, 2018, 24 pages (14 pages of English Translation and 10 pages of Official Copy).

Office Action received for Chinese Patent Application No. 201480043032.8, dated May 16, 2017, 18 pages (10 pages of English Translation and 8 pages of Official Copy).

International Preliminary Report on Patentability received for PCT Application No. PCT/US2014/032269, dated Dec. 10, 2015, 6 pages.

Response to Office Action filed on Sep. 28, 2017 for Chinese Patent Application No. 201480043032.8, dated May 16, 2017, 14 with English Claims.

Response to Office Action filed on May 17, 2017 for Korean Patent Application No. 10-2015-7036895, dated Feb. 17, 2017, 24 pages (20 pages of Official Copy and 4 pages of English Claims).

Response to Office Action filed on Mar. 23, 2018 for Chinese Patent Application No. 201480043032.8, dated Jan. 9, 2018, 11 pages (2 pages of English Translation, 5 pages of Official copy and 4 pages of English Claims).

Extended European Search Report received for European Patent Application No. 181893645, dated Nov. 21, 2018, 9 pages.

Berry, "15 Seconds: Sharing Cookies Across Domains", Retrieved from the Internet: URL: <http://www.15seconds.com/issue/971188.htm>, Aug. 11, 1997, pp. 1-4.

Anonymous, "URL Redirection- Wikipedia", Retrieved from the Internet: URL: <https://en.wikipedia.org/w/index.php?title=URL redirection&oldid=541887144>, Feb. 28, 2013, pp. 1-10.

Network Working Group, "RFC 2616—1-11 Hypertext Transfer Protocol—HTTP/1.1", Retrieved from the Internet: URL: <https://tools.ietf.orgjhtml/rfc2616>, Jun. 30, 1999, 177 pages.

* cited by examiner

SYSTEMS AND METHODS OF TOKEN PIGGYBACKING

TECHNICAL FIELD

This application relates generally to data processing and, in some examples, to systems and methods for communicating token values associated with different domain names.

BACKGROUND

Many traditional computer systems communicate with each other using web-based communication protocols such as hypertext transfer protocol (HTTP). HTTP may function as a request-response protocol in a client-server computing model. For example, a web browser may be the client and an application running on a computer hosting a web site may be the server. The client submits an HTTP request message to the server. The server, which provides resources such as HTML files and other content, or performs other functions on behalf of the client, returns a response message to the client. The response contains completion status information about the request and may also contain requested content in its message body.

However, the request-response protocol defined by HTTP is a stateless communication protocol. That is, an HTTP server does not retain information or status about each user for the duration of multiple requests. However, some web applications implement states or server side sessions using cookies, for example. A cookie, also known as an HTTP cookie, web cookie, or browser cookie, may be in some circumstances a small piece of data sent from a website and stored in a user's web browser while a user is browsing a website. When the user browses the same website in the future, the data stored in the cookie can be retrieved by the website to notify the website of the user's previous activity.

Cookies were designed to be a reliable mechanism for websites to remember the state of the website or activity the user had taken in the past. This can include a record of clicking particular buttons, a record of logging in, or a record of which pages were visited by the user even months or years ago.

BRIEF DESCRIPTION OF THE DRAWINGS

Some embodiments are illustrated by way of example and not limitation in the figures of the accompanying drawings in which.

DETAILED DESCRIPTION

Example systems and methods of communicating tokens associated with different domain names (e.g., websites) are described herein. In the following description, for purposes of explanation, numerous specific details are set forth in order to provide a thorough understanding of example embodiments. It will be evident, however, to one skilled in the art that the present embodiments of the invention may be practiced without these specific details. It will also be evident that cookie or, more generally, token piggybacking is not limited to the examples provided and may include other scenarios not specifically discussed.

As used herein, the term "token" may refer to data that specifies a state of a communication session of a stateless communication protocol. A stateless communication protocol may be a communication protocol between a server computer and a client device where the server computer system does not store the state of the communication session. A communication session may include multiple request-response messages exchanged with a client application (e.g., a web browser) running on a client device. Rather than keeping the state of the session in the protocol, the client application may store and maintain tokens used to specify state data. Once set, the client application includes the tokens in subsequent request messages sent to the server computer. An example of a token is a cookie used in HTTP communication.

In example embodiments described herein, a computer-implemented system may store, on a client device, a token under a first domain name. As described above, the token may be a token or any other suitable data that specifies state data for a communication session between the client device and a first content publisher addressed by the first domain name. In some cases, the communication session utilizes a stateless communication protocol, such as HTTP. After storing the token on the client device, the system may then generate a redirection resource locator. In some embodiments, the redirection resource locator identifies a web object belonging to a second content publisher addressed by a second domain name and the token.

The system may then store, on the client device, the token under the second domain name by directing the client device to send a web object request generated based at least in part on the redirection resource locator to the second content publisher. The web object request may specify the web object and the new token. In some cases, the web object specified by the web object request is a server side script that causes the second content publisher to set the token, on the client device, under the second domain name.

These and other embodiments are now described in greater detail. For clarity of description, the example embodiments described below may be described with references to cookies. It is to be appreciated, however, that it is contemplated by this disclosure that other embodiments may operate not just on cookies but also on any other suitable type of token used to maintain state for a communication session of a stateless communication protocol. Thus, the terms "cookie" and "token," as used below, may be used interchangeably.

Platform Architecture

Figure 1:
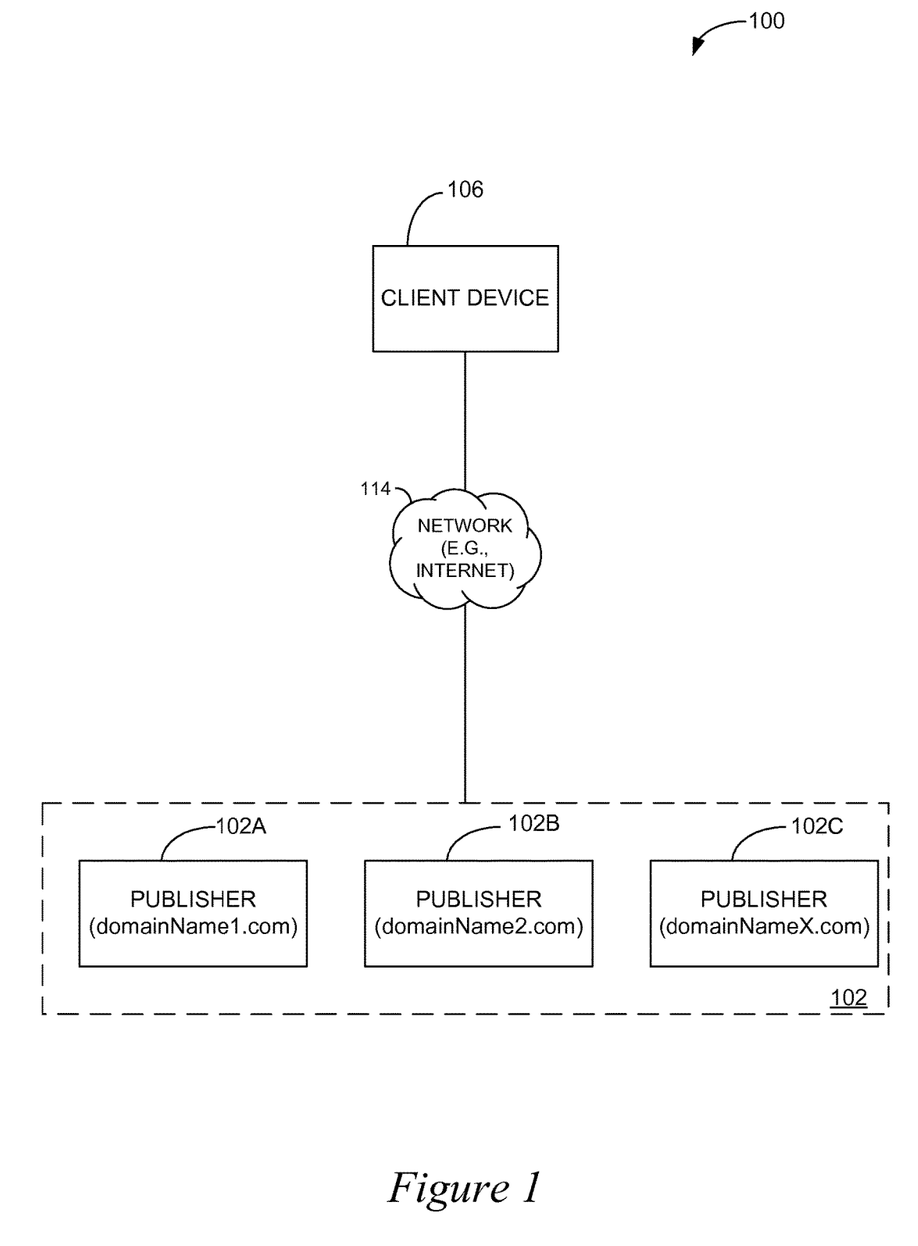
FIG. 1 is a network diagram depicting a cookie piggy-backing system, according to an example embodiment.

FIG. 1 is a network diagram depicting a cookie piggybacking system 100, according to an example embodiment. The cookie piggybacking system 100 may include various components that facilitate communication of cookie values set by content publishers identified by different domain names. For example, in an example embodiment, the cookie piggybacking system 100 may include components (described in greater detail below) that allows one website to carry cookies pertaining to that website on a cookie pertaining to another website. FIG. 1 shows that the cookie piggybacking system 100 includes content publishers 102A-C (collectively referred to as content publishers 102) communicatively coupled to a client device 106 via a network 114.

The network 114 may be any suitable network used to communicate data between the components shown in FIG. 1. In various embodiments, one or more portions of the network 114 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The content publishers 102 may be computer systems that are configured to provide data or a service to the client device 106. In many embodiments, the content publishers may communicate content (e.g., webpages) according to a communication protocol, such as, for example, HTTP or HTTPS. Each of the content publishers 102 may be network addressable computer systems identifiable according to different domain names. For example, FIG. 1 shows that the content publisher 102A is identifiable with by domainName1.com, the content publisher 102B is identifiable by domainName2.com, and the content publisher 102C is identifiable by domainNameX.com.

In some embodiments, the content published by the content publishers 102 includes user interactive elements. For example, content in the form of a webpage may include interactive elements that allow the user to navigate from one page to another, view multimedia, add content, communicate with other users, and the like. In some cases, the content publishers 102 may desire to track a user's interaction with the interactive elements of the content published by the content publishers 102. However, as is with the case for webpages communicated over the Internet using HTTP, the client device 106 and the content publishers 102 may utilize a stateless protocol (e.g., HTTP treats each request as an independent transaction that is unrelated to any previous request so that the communication consists of independent pairs of requests and responses) to communicate the content provided by the content publishers 102. To track user behavior, the content publishers 102 may utilize cookies. As described above, a cookie may be data sent by the content providers 102 and stored by the client device 106 (e.g., a web browser running on the client device 106) when the client device 106 accesses particular content published by one of the content publishers 102. When the client device later requests the same website, the client device may also send the cookie previously set to notify the content publisher of the user's previous activity. As is described in greater detail below, the content publishers 102 may be configured to piggyback a cookie belonging to one domain name onto another cookie belonging to another domain name.

The client device 106 may be a computing device (e.g., desktop, mobile phone, laptop, tablet, camera, set-top box, gaming console, or the like) that is configured to request and view content communicated from the content publishers 102. For example, the client device 106 may execute a web browser configured to send HTTP requests for given webpages associated with the content publishers.

It should be noted that the cookie piggybacking system 100 shown in FIG. 1 is exemplary. For example, alternative embodiments may comprise any number of content publishers 102, client devices 106, and networks 114 in the cookie piggybacking system 100.

The modules and operation of the components of the cookie piggybacking system 100, according to example embodiments, are described in greater detail below.

Client Device Modules

Figure 2:
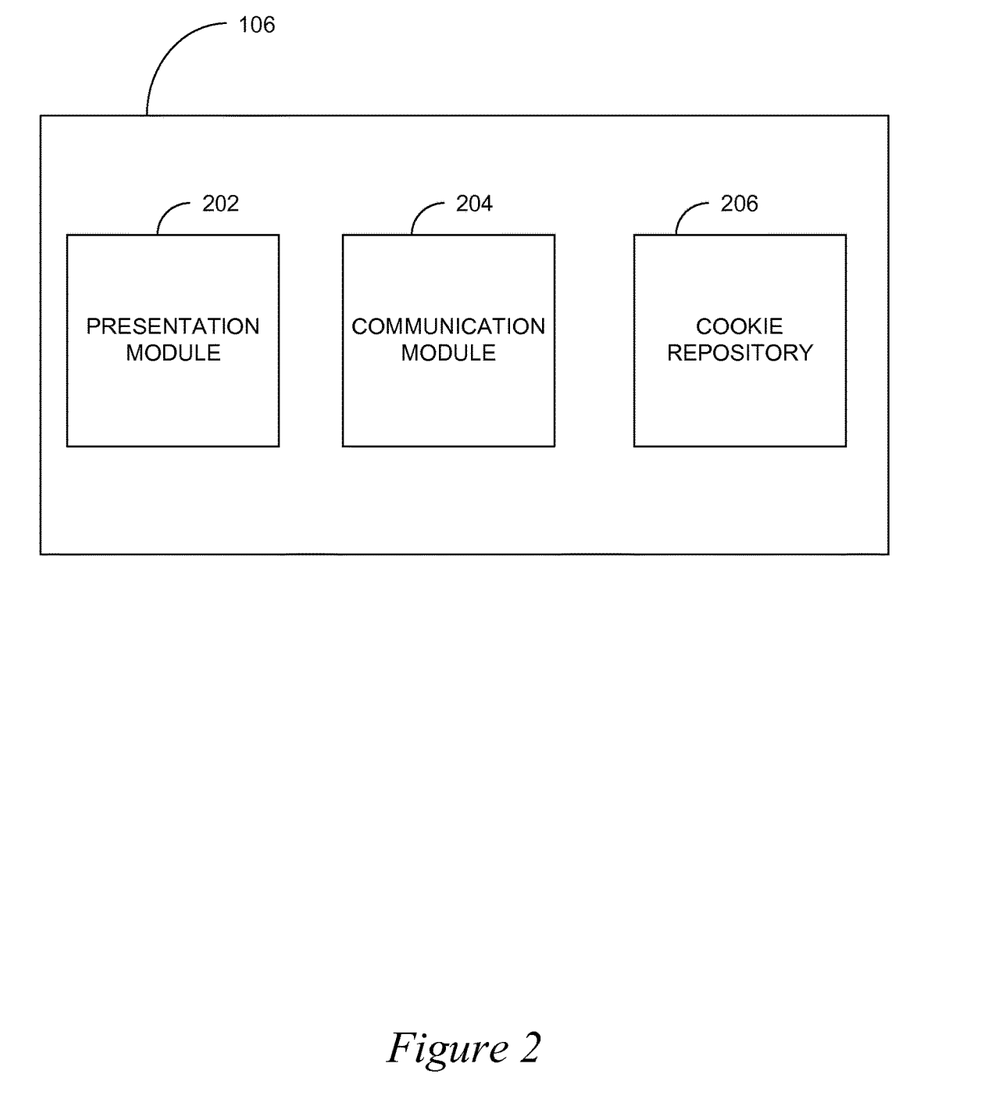
FIG. 2 is a block diagram illustrating example computer-implemented modules that may be provided by the client device shown in FIG. 1 for facilitating cookie piggybacking, according to an example embodiment.

FIG. 2 is a block diagram illustrating example computer-implemented modules that may be provided by the client device 106 shown in FIG. 1 for facilitating cookie piggybacking, according to an example embodiment. As FIG. 2 shows, the client device 106 may, in an example embodiment, include a presentation module 202, a communication module 204, and a cookie repository 206. Consistent with embodiments contemplated by this disclosure, the presentation module 202, the communication module 204, and the cookie repository 206 may form at least a portion of the modules utilized by a web browser or a web application operating on the client device 106.

The presentation module 202 may be a computer-implemented module configured to render and display content received from the content publishers 102. For example, the presentation module 202 may process a HTML code, JavaScript, images, video, audio, XML, plug-ins, Flash applications, Java applets, and any other suitable content to generate data that is capable of being rendered or otherwise displayed to the user (e.g., through a computer screen). Generally, the presentation module 202 may transform one or more content files in a markup language (e.g., HTML) to an interactive document that is displayable to a user.

The communication module 204 may be a computer-implemented module configured to exchange electronic communications with other components in the cookie piggybacking system 100. For example, in one example embodiment, the communication module 204 may be configured to send and receive HTTP requests and responses through the network 114.

Figure 3:
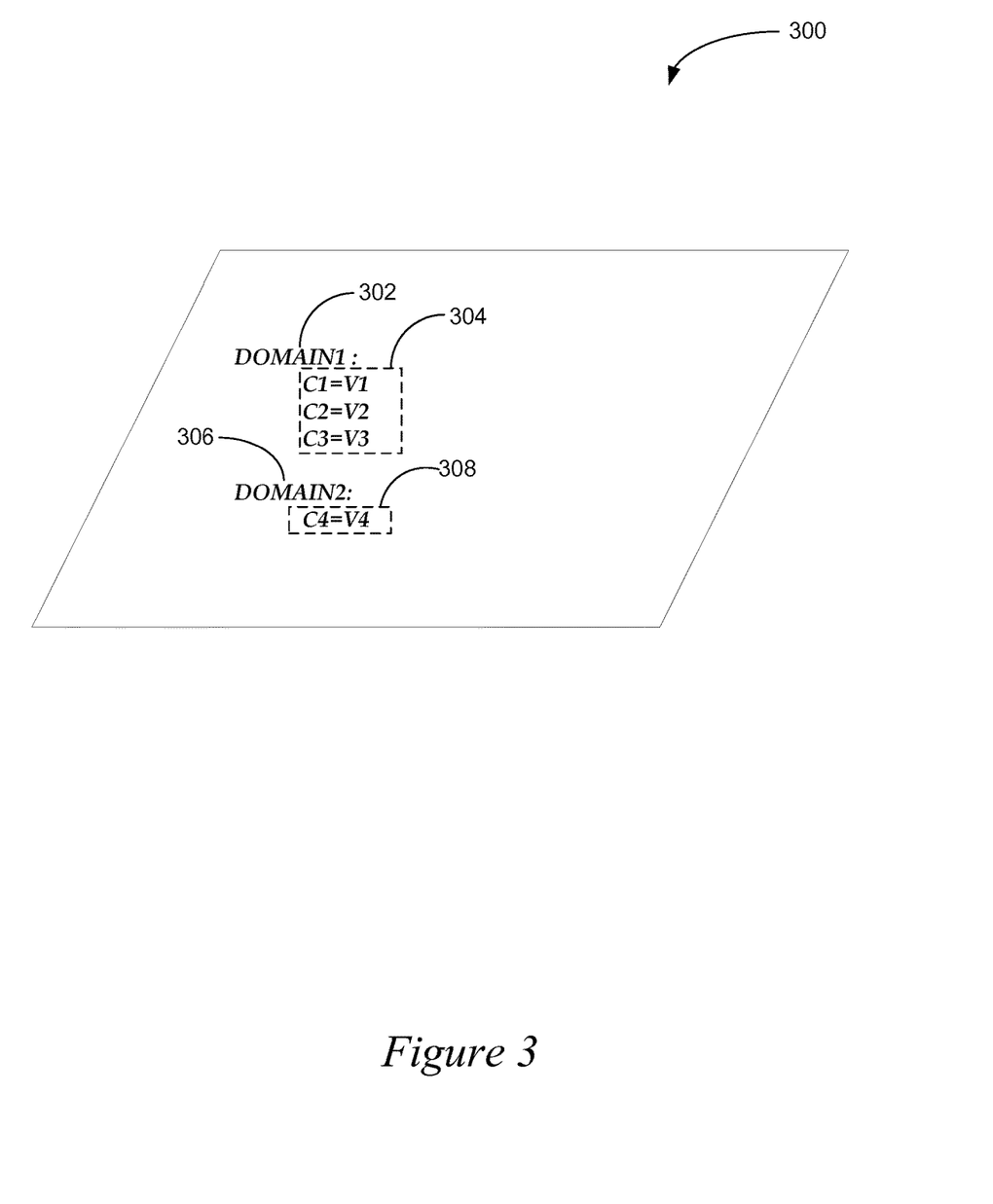
FIG. 3 is a diagram illustrating an example cookie data structure that may be stored by the cookie repository of FIG. 2, according to an example embodiment.

The cookie repository 206 may be a computer-implemented module configured to store, retrieve, and manage cookies exchanged between the client device 106 and the content publishers 102. In an example embodiment, the cookie repository 206 may organize cookies set by the content publishers 102 based on the domain name associated with the content publisher. For example, FIG. 3 is a diagram illustrating an example cookie data structure 300 that may be stored by the cookie repository 206, according to an example embodiment. As FIG. 3 shows, the cookie data structure may include data representing multiple domain names (e.g., domain names 302, 306) and sets of cookies (e.g., cookie set 304, 308) belonging to those domain names. As discussed above, a domain name represents an IP resource, such as a personal computer used to access the Internet, a server computer hosting a web site, or the web site itself or any other service communicated via the Internet. domainName1.com is an example of a domain name belonging to the content publisher 102A. Accordingly, the domain names 302, 306 may represent the domain names associated with the content publishers 102.

The cookie sets 304, 306 may each include one or more cookies. As shown in FIG. 3, each of the cookies may be represented as a name value pair. For example, the cookie "C1=V1" may represent a cookie identified by C1 and the value of C1 may be represented by V1.

Operationally, the cookie repository 206 may set, in some embodiments, cookies based on an explicit instruction found in an HTTP response message. For example, responsive to receiving an HTTP request message from the client device 106, the web server may send an HTTP response message with the following directive:

Set-Cookie: C1=V1

Such a directive may cause the cookie repository 206 to store the name value pair C1=V1 under the domain name for the web server. Thereafter, when the client device 106 sends subsequent HTTP request messages to the domain name for the web server, the cookie repository 206 may include the name value pair in the HTTP request message. It is to be appreciated that the stateless communication protocol may include rules or guidelines that prohibit a web server from one domain name from setting cookie values under the domain name of another web server.

It is to be appreciated that FIG. 3 is provided merely as an example and not limitation. Other embodiments may store other types of data with reference to the cookies, such as directory paths, expiration data, and the like.

Further details concerning the methods of operation of the presentation module 202, the communication module 204, and the cookie repository 206 are discussed below with reference to FIGS. 6 and 7.

Content Publisher Modules

Figure 4:
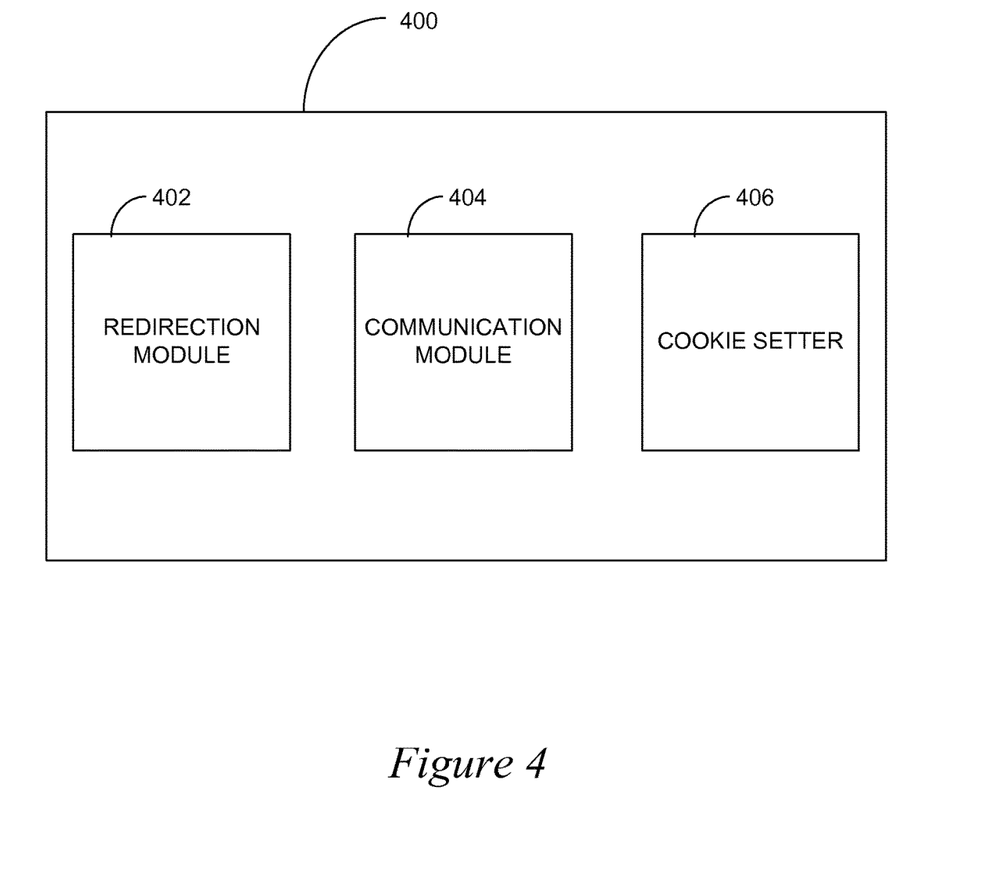
FIG. 4 is a block diagram illustrating example computer-implemented modules for a redirecting content publisher that facilitates cookie piggybacking, according to an example embodiment.

FIG. 4 is a block diagram illustrating example computer-implemented modules for a redirecting content publisher 400 that facilitates cookie piggybacking, according to an example embodiment. The redirecting content publisher 400 may be one of the content publishers 102 shown in FIG. 1. In an example embodiment, the redirecting content publisher 400 may include one or more modules for communicating cookies to another content publisher using a redirection message.

According to the example embodiment shown in FIG. 4, the redirecting content publisher 400 may include a redirection module 402, a communication module 404, and a cookie setter 406. The redirection module 402 may be a computer-implemented module configured to redirect cookies previously set by the redirecting content publisher 400. In an example embodiment, the redirection module 402 may redirect cookies associated with the redirecting content publisher 400 to another content publisher by causing the client device 106 to send a request to the other content publisher that includes a representation of the redirected cookies in the URL. This is described in greater detail below with reference to FIG. 6.

The communication module 404 may be a computer-implemented module configured to exchange electronic communications with other components in the cookie piggybacking system 100. For example, in one example embodiment, the communication module 404 may be configured to send and receive HTTP requests and responses through the network 114.

The cookie setter 406 may be a computer-implemented module configured to set cookies in the client device 106. As described above, the client device 106 may include the cookie repository 206 for storing the cookies set by the content publishers 102. Accordingly, the cookie setter 406 may cause the cookie repository 206 to store cookies associated with the domain name of the redirecting content publisher 400.

Figure 5:
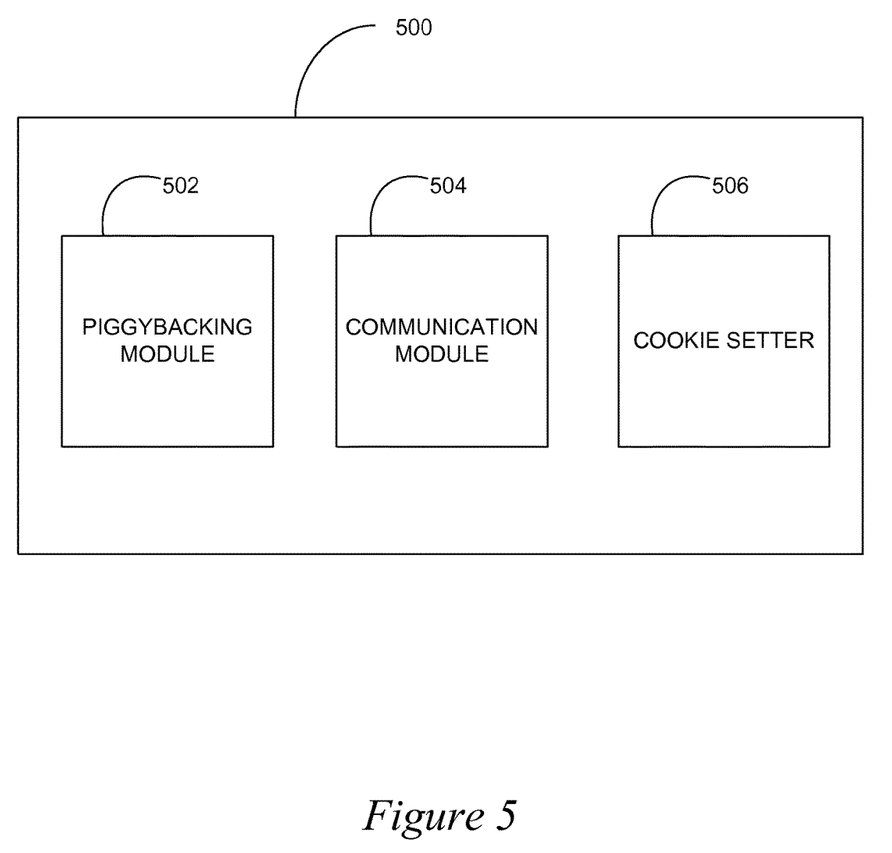
FIG. 5 is a block diagram illustrating example computer-implemented modules for a piggybacking content publisher that facilitates cookie piggybacking, according to an example embodiment.

FIG. 5 is a block diagram illustrating example computer-implemented modules for a piggybacking content publisher 500 that facilitates cookie piggybacking, according to an example embodiment. The piggybacking content publisher 500 may be one of the content publishers 102 shown in FIG. 1. In an example embodiment, the cookie piggybacking content publisher 500 may include one or more modules for receiving cookies that were redirected from another content publisher.

As FIG. 5 shows, the piggybacking content publisher 500 may include, in an example embodiment, a piggybacking module 502, a communication module 504, and a cookie setter 506. The piggybacking module 502 may be a computer-implemented module configured to receive cookies belonging to another content publisher and to cause the client device 106 to store the redirected cookies under the domain name of the cookie piggybacking content publisher 500.

The communication module 504 may be a computer-implemented module configured to exchange electronic communications with other components in the cookie piggybacking system 100. For example, in one example embodiment, the communication module 504 may be configured to send and receive HTTP requests and responses through the network 114.

The cookie setter 506 may be a computer-implemented module configured to set cookies in the client device 106. As described above, the client device 106 may include a cookie repository 206 for storing the cookies set by the content publishers 102. Accordingly, the cookie setter 506 may cause the cookie repository 206 to store cookies associated with the domain name of the piggybacking content publisher 500.

Example Methods for Cookie Piggybacking

Figure 6:
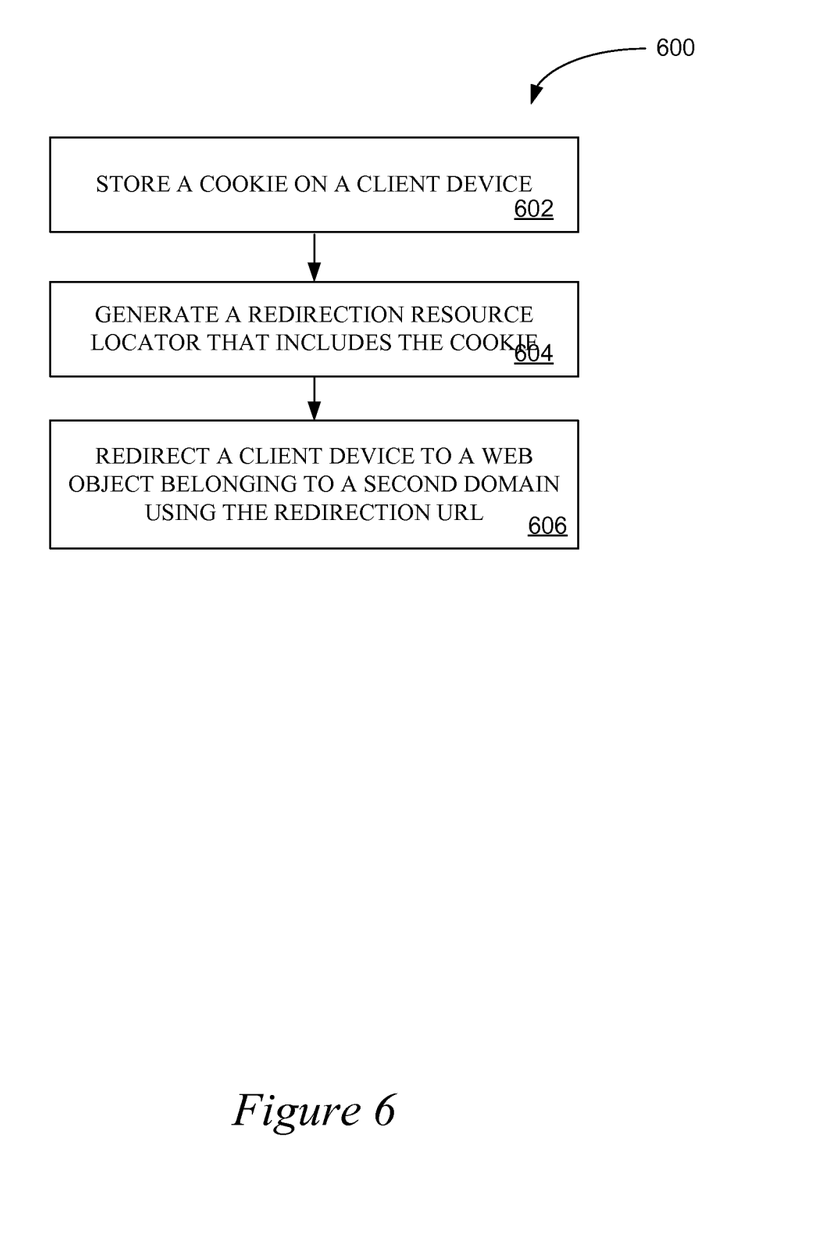
FIG. 6 is a flow chart illustrating an example method for cookie piggybacking, according to an example embodiment.

FIG. 6 is a flow chart illustrating an example method 600 for cookie piggybacking, according to an example embodiment. The method 600 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the components and modules illustrated in FIGS. 1-5. Accordingly, the method 600 is discussed with reference to the components, systems, and modules discussed with respect to FIGS. 1-5.

As shown in FIG. 6, the method 600 may begin at operation 602 when the cookie setter 406 of the redirecting content publisher 400 stores a cookie within the client device 106. To illustrate how the redirecting content publisher 400 may store a cookie on the client device 106, the client device 106 may initially send the HTTP request represented by Table 1 to the redirecting content publisher 400.

TABLE 1

GET /index.html HTTP/1.1
Host: www.domainName1.com

In response to receiving the HTTP request represented by Table 1, the redirecting content publisher 400 may send an HTTP response represented by Table 2 to the client device 106.

TABLE 2

HTTP/1.1 200 OK
Content-type: text/html
Set-Cookie: name=value
(Content of /index.html)

It is to be appreciated that the line "Set-Cookie: name=value" is a directive to the client device 106 to store the cookie (e.g, "name=value") under the domain name of the redirecting content publisher 400 (e.g., www.domainName1.com) and to send the cookie back in future requests for resource objects under the domain name belonging to the redirecting content publisher 400 (e.g., www.domainName1.com). By way of example and not by limitation, operation 602 may occur when a user logs into a website hosted by the redirecting content publisher 400. An example of the cookie value may be a username.

At operation 604, the redirection module 402 generates and communicates a redirecting resource locator to the client device 106. In an example embodiment, the redirecting resource locator may be data that causes the client device 106 to request a web resource from the piggybacking content provider 500. A URL embedded in a user interface element (e.g., a link) is an example of redirecting resource locator. A redirection HTTP message is another example of a redirection resource locator. In some embodiments, the redirecting resource locator may include data representing one or more cookie previously set by the redirecting content provider 400 (e.g., the cookie set as part of operation 602). In one example embodiment, the redirection module 402 may communicate the redirecting resource locator as an element of the content communicated to the client device 106. For example, the redirection module 402 may generate the following code which may be embedded in a webpage communicated to the client device 106 as a link:
    domainName2.com/piggyback.php?domainName1=Hash(name=value)
In the above code, domainName2.com identifies the domain name belonging to the piggybacking content publisher 500, piggyback.php refers to a server side script executing on a computer system of the piggybacking content publisher 500, the symbol ? denotes the beginning of a query string, and the domainName1=Hash(name=value) represents a query string, where domainName1 identifies a name for a name value pair in the query string that stores the cookies associated with the domain name of the redirecting content publisher 400 and Hash(name=value) represents a hash encoded representation of the cookies previously set for the domain name of the redirecting content publisher 400. Although the redirecting resource locator has been described as including one cookie previously set for the redirecting content publisher 400, other embodiments may include one or more additional cookies previously set by the redirecting content publisher 400.

At operation 606, the client device 106 is directed to a web object under the domain name of the piggybacking content publisher 500 based on the redirecting resource locator with the encoded cookie. Operation 608 may occur responsive to a user clicking the redirecting resource locator embedded in the redirecting content publisher's web page or responsive to a redirection HTTP message sent by the redirecting content publisher 400.

Figure 7:
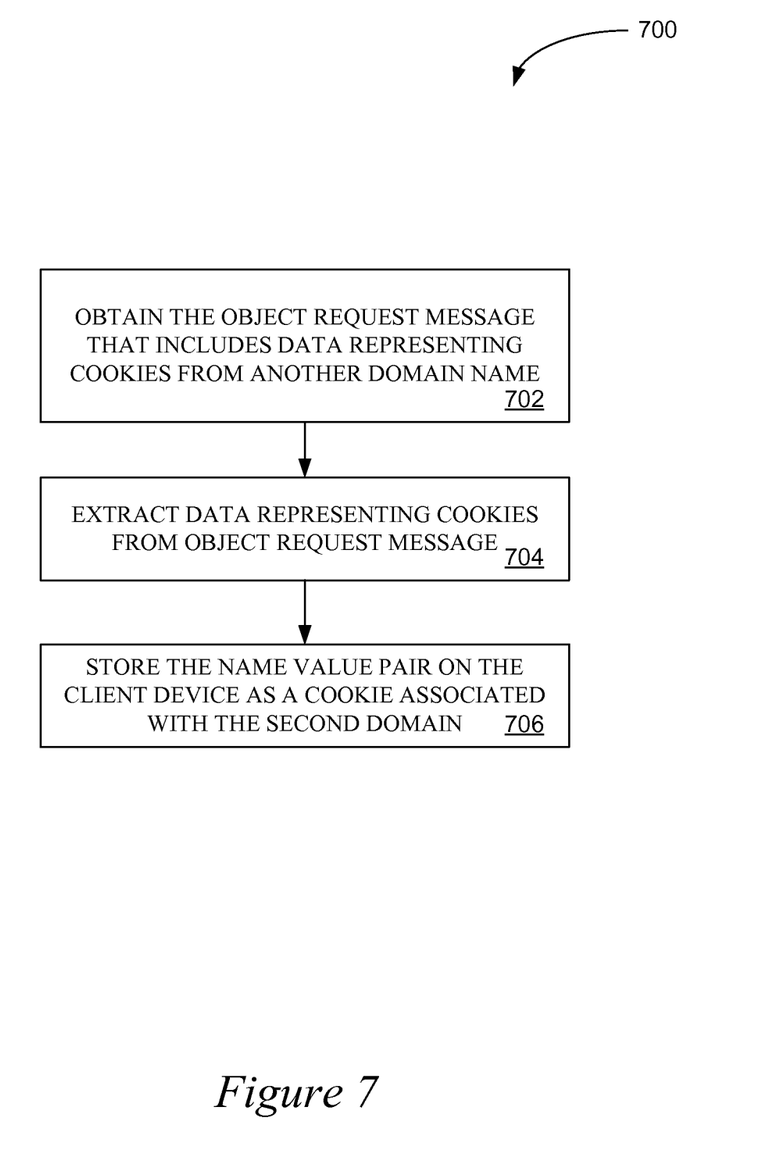
FIG. 7 is a flow chart illustrating an example method for piggybacking the redirected cookies on as cookie belonging to the piggybacking content publisher, according to an example embodiment.

While FIG. 6 illustrates operations for redirecting cookies belonging to the redirecting content publisher 400, FIG. 7 is a flow chart illustrating an example method 700 for piggybacking the redirected cookies on as cookie belonging to the piggybacking content publisher 500, according to an example embodiment. The method 700 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the components and modules illustrated in FIGS. 1-5. Accordingly, the method 700 is discussed with reference to the components, systems, and modules discussed with respect to FIGS. 1-5. At operation 702, the piggybacking module 502 may obtain a web object request from the client device 106 that includes data representing redirected cookies belonging to the redirecting content publisher 400. To illustrate operation 702, the user, upon receiving the webpage with the redirecting resource location from the redirecting content publisher 400, may select the redirecting resource locator. Selecting the redirecting resource locator may cause the client device to send a web object request to the piggybacking content publisher 500. Using the above example, domainName2.com/piggyback.php?domainName1=Hash(name=value) is an example of a redirecting resource locator with encoded cookies (e.g., Hash(name=value)) from the redirecting content publisher 400 stored in the query portion of a URL.

At operation 704, the piggybacking module 502 may extract the data representing the redirected tokens from the web object request. As described above, the redirected tokens may be communicated as part of a query string of a URL. Accordingly, operation 704 may involve a server-side script (for example, using the above redirecting resource locator, piggyback.php) extracting the redirected tokens from the query string of received web object request. In some embodiments, extracting the redirected tokens may involve using a hash function to convert the cookies from an encoded form to a usable form. In other embodiments, the redirected tokens are left in their encoded form to preserver privacy data.

At operation 706, the cookie setter 506 of the piggybacking content publisher 502 may set the redirected cookies as a cookie belonging to the piggybacking content publisher 500. In one embodiment, operation 706 involves the piggybacking module 502 sending an HTTP response back to the client device that includes a directive that sets a cookie to have a value that represents the redirected cookies. To illustrate operations 704 and 706, the piggybacking module 502 may execute the following server-side code to extract the data representing the redirected tokens from the web request:

```
<?php
    setcookie('domainName1', $_GET['domainName1']);
    header("Location: domainName2.com/index");
?>
```

In the above code, the setcookie operation may be a PHP function that defines a cookie (e.g., name value pair) to be included in a HTTP header of an HTTP response. The 'domainName1' may be an argument to the setcookie operation that specifies a name for the cookie being set by the setcookie operation. The $_GET['domainName1'] may be a PHP directive that collects the value portion for a name-value pair specified in the query string. In the above server-side code, the result of the $_GET['domainName1'] PHP directive is used as a value argument for the setcookie operation. The value argument specifies the value for the cookie being set by the setcookie operation.

The header operation cause the piggybacking module 502 to send an HTTP response that redirects the browser operating on the client device 106 to be redirected to domainName2.com/index. The HTTP response sent responsive to the header operation also includes the cookie set by the setcookie operation. Using the redirection resource locator described above, the above server-side code may generate the following HTTP response message.

TABLE 3

HTTP/1.1 200 OK
Content-type: text/html
Set-Cookie: domainName1=Hash(name=value)
(Content of /index.html)

Figure 8:
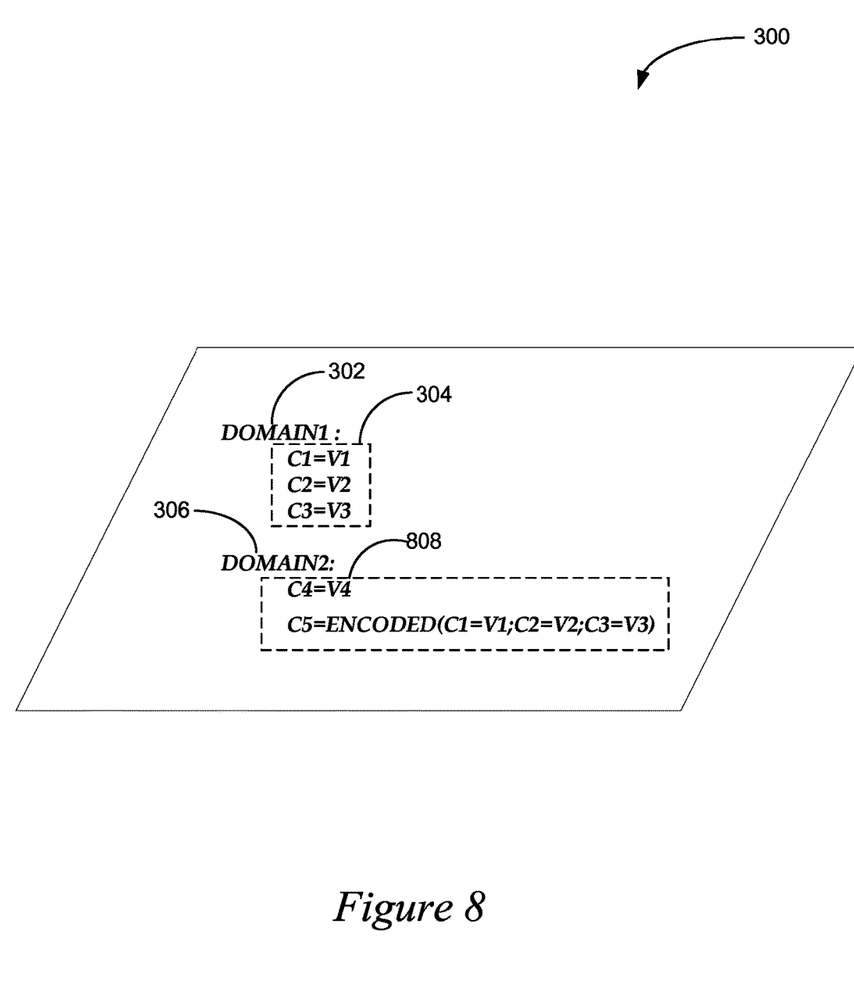
FIG. 8 shows the cookie data structure of FIG. 3 after the cookie piggybacking content publisher 500 sets cookie values redirected by another content publisher, according to an example embodiment.

It is to be appreciated that when the piggybacking module 502 stores the cookie at operation 706, the cookies previously set by the redirecting content publisher 400 are now incorporated with the cookies stored under the domain name assigned to the piggybacking content publisher 500. For example, FIG. 8 shows the cookie data structure 300 of FIG. 3 after having cookie values set by the cookie piggybacking content publisher 500, according to an example embodiment. For example, compared to the cookie set 308 shown in FIG. 3, the cookie set 808 shown in FIG. 8 includes a representation of the cookie set 304.

It is to be appreciated that piggybacking cookies from one domain name with a cookie from another domain name may have many practical applications. For example, cookie piggybacking may facilitate a unified user profile. A unified user profile may incorporate cookies belonging to one domain name with cookies belonging to another domain name. A unified user profile may be useful to an advertisement system that targets advertisement messages to a user that visits multiple websites over an extended time period. For example, the redirecting content publisher 400 may redirect a cookie identifying a username for a user that visited the website and other cookies specifying user interactions (e.g., products being viewed by the user, interactions with content relating to a product, etc.) to the piggybacking content publisher 500. In turn, the piggybacking content publisher 500 may track user behavior with content that it serves to the user. Thus, the piggybacking content publisher 500 may have user interaction data (stored by cookies) stored not only from content that the piggybacking content publisher 500 publishes but also from content published by the redirecting content publisher 400. In some cases, the piggybacking content publisher 500 may also be a redirecting content publisher that redirects its cookies to another piggybacking content publisher (e.g., content publisher 102C from FIG. 1). Thus, this additional piggybacking content publisher may store cookies specifying user interactions not only from generated from content it publishes, but also from the piggybacking content publisher 500 and the redirecting content publisher 400.

Such user interaction may be useful to advertisement systems. For example, an advertisement system may build a user name profile used by a user across multiple domain names. From this mapping, the advertisement system may then map the user interaction data specified by the various tokens associated with the different domain names to a unified user account. That is, based on the piggyback tokens, the advertisement system may associate a unified user account with two different user names, one used by domainName1.com and one used by domainName2.com. Thus, user interaction data generating by either username may be associated with the unified user name.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
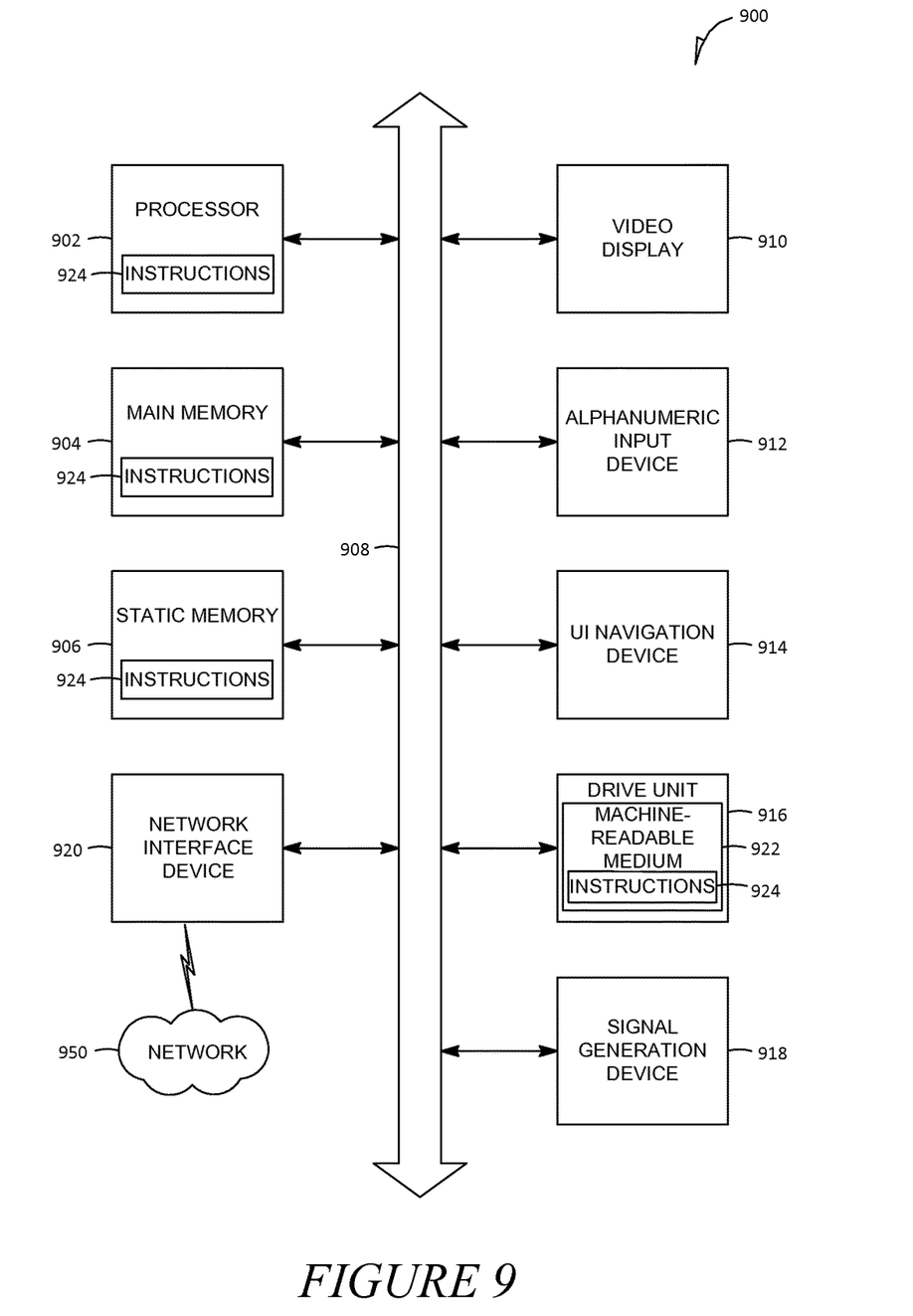
FIG. 9 is a diagrammatic representation of a machine in the example form of a computer system within which a set of instructions for causing the machine to perform any one or more of the methodologies discussed herein, according to an example embodiment.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of data structures and instructions (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more data structures and instructions 924. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present embodiments of the invention has been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer system implementing a first content publisher addressable by a first domain name, the computer system comprising:
   at least one processor implementing a plurality of software modules embodied on one or more machine-readable media, the modules comprising:
   a cookie setter configured to cause a client device communicatively coupled to the first content publisher to store a plurality of tokens under the first domain name, the plurality of tokens specifying state data during a communication session between the client device and the first content publisher, the communication session utilizing a stateless communication protocol, each of the plurality of tokens comprising a respective name-value pair;
   a redirection module configured to embed, in content provided by the first content publisher, a uniform resource locator identifying a server-side script hosted by a second content publisher addressable by a second domain name, the redirection module further to embed, in association with the uniform resource locator, data representing the name-value pairs of the plurality of tokens; and a communication module configured to communicate the content with the embedded uniform resource locator to the client device, selection of the uniform resource locator by a user causing the client device to send a web request for the server-side script to the second content publisher, the web request including the data representing the name-value pairs of the plurality of tokens, execution of the server-side script causing the second content publisher to extract the data representing the name-value pairs of the plurality of tokens and to send a directive to the client device to set, under the second domain name, a token having a name-value pair whose value encodes the name-value pairs of the plurality of tokens previously set under the first domain name.

2. The computer system of claim 1, wherein the web request is a hypertext transfer protocol request message.

3. The computer system of claim 1, wherein the data representing the name-value pairs of the plurality of tokens is an encoded representation.

4. The computer system of claim 3, wherein extracting the data representing the name-value pairs of the plurality of tokens comprises converting the name-value pairs from the encoded representation to a usable form.

5. The computer system of claim 3, wherein the data representing the name-value pairs of the plurality of tokens is left in the encoded representation to preserve privacy.

6. The computer system of claim 1, wherein one of the name-value pairs of the plurality of tokens represents a user name used by the first content publisher to track user interactions involving a user of the first content publisher.

7. A computer-implemented method comprising:
by a first content publisher addressable by a first domain name and communicatively coupled to a client device,
setting a plurality of tokens on the client device under the first domain name, the tokens specifying state data during a communication session between the client device and the first content publisher, the communication session utilizing a stateless communication protocol, each of the plurality of tokens comprising a respective name-value pair;
embedding, in content provided by the first content publisher, a uniform resource locator identifying a server-side script hosted by a second content publisher addressable by a second domain name, and further embedding, in association with the uniform resource locator, data representing the name-value pairs of the plurality of tokens; and
communicating the content with the embedded uniform resource locator to the client device to direct the client device to send, responsive to selection of the uniform resource locator by a user, a web request for the server-side script to the second content publisher, the web request including the data representing the name-value pairs of the plurality of tokens, execution of the server-side script causing the second content publisher to send a directive to the client device to set, under the second domain name, a token having a name-value pair whose value encodes the name-value pairs of the plurality of tokens previously set under the first domain name.

8. The computer-implemented method of claim 7, wherein the web request is a hypertext transfer protocol request message.

9. The computer-implemented method of claim 7, further comprising, prior to generating the redirection resource locator, encoding at least a portion of the plurality of tokens, the data representing the name-value pairs of the plurality of tokens being an encoded representation.

10. The computer-implemented method of claim 9, wherein extracting the data representing the name-value pairs of the plurality of tokens comprises converting the name-value pairs from the encoded representation to a usable form.

11. The computer-implemented method of claim 9, wherein the data representing the name-value pairs of the plurality of tokens is left in the encoded representation to preserve privacy.

12. The computer-implemented method of claim 7, wherein one of the name-value pairs of the plurality of tokens represents a user name used by the first content publisher to track user interactions involving a user of the first content publisher.

13. The method of claim 7, further comprising:
by the second content publisher,
causing the client device to store one or more additional tokens under the second domain name; and
redirecting the additional tokens and the token encoding the plurality of tokens previously set under the first domain name to a third content publisher, thereby causing the third content publisher to store tokens from the first and second content publishers under the third content publisher's domain name.

14. A non-transitory computer-readable medium storing executable instructions thereon, which, when executed by a processor of a first content publisher addressable by a first domain name, cause the processor to perform operations comprising:
causing a client device communicatively coupled to the first content publisher to store a plurality of tokens under a first domain name, the plurality of tokens specifying state data during a communication session between the client device and the first content publisher, the communication session utilizing a stateless communication protocol, each of the plurality of tokens comprising a respective name-value pair;
embedding, in content provided by the first content publisher, a uniform resource locator identifying a server-side script hosted by a second content publisher addressable by a second domain name, and further embedding, in association with the uniform resource locator, data representing the plurality of tokens; and
communicating the content with the embedded uniform resource locator to the client device to direct the client device to send, responsive to selection of the uniform resource locator by a user, a web request for the server-side script to the second content publisher, the web request including the data representing the name-value pairs of the plurality of tokens, execution of the server-side script causing the second content publisher to send a directive to the client device to set, under the second domain name, a token having a name-value pair whose value encodes the name-value pairs of the plurality of tokens previously set under the first domain name.

15. The non-transitory computer-readable medium of claim 14, wherein the data representing the name-value pairs of the plurality of tokens is an encoded representation.

16. The non-transitory computer-readable medium of claim 15, wherein extracting the data representing the name-value pairs of the plurality of tokens comprises converting the name-value pairs from the encoded representation to a usable form.

17. The non-transitory computer-readable medium of claim 15, wherein the data representing the name-value pairs of the plurality of tokens is left in the encoded representation to preserve privacy.

18. The non-transitory computer-readable medium of claim 14, wherein one of the name-value pairs of the plurality of tokens represents a user name used by the first content publisher to track user interactions involving a user of the first content publisher.

* * * * *